(12) United States Patent
Saini et al.

(10) Patent No.: US 10,028,045 B1
(45) Date of Patent: Jul. 17, 2018

(54) COMBINED MICROPHONE AND LIGHTING DEVICE AND COMPUTING DEVICE HAVING SAME

(71) Applicant: GOOGLE INC., Mountain View, CA (US)

(72) Inventors: Vivek Saini, Mountain View, CA (US); Michael Asfaw, Mountain View, CA (US); Leng Ooi, San Jose, CA (US); Lawrence Lam, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/634,222

(22) Filed: Jun. 27, 2017

(51) Int. Cl.
| | |
|---|---|
| *H04R 1/02* | (2006.01) |
| *H04R 1/04* | (2006.01) |
| *H04R 1/08* | (2006.01) |
| *F21V 33/00* | (2006.01) |
| *F21V 19/00* | (2006.01) |
| *F21V 31/00* | (2006.01) |
| *G06F 1/16* | (2006.01) |

(52) U.S. Cl.
CPC ......... *H04R 1/028* (2013.01); *F21V 19/0015* (2013.01); *F21V 31/005* (2013.01); *F21V 33/0056* (2013.01); *G06F 1/1684* (2013.01); *H04R 1/04* (2013.01); *H04R 1/08* (2013.01); *G06F 1/1616* (2013.01); *H04R 2499/15* (2013.01)

(58) Field of Classification Search
CPC .................................................. H04R 1/2846
See application file for complete search history.

(56) References Cited

U.S. PATENT DOCUMENTS

| | | | |
|---|---|---|---|
| 7,062,059 B1 | 6/2006 | Bobisuthi | |
| 7,306,347 B2 | 12/2007 | Selover | |
| 8,023,679 B2* | 9/2011 | Liu | ............ H04R 1/10 381/122 |
| 8,295,527 B2* | 10/2012 | Chen | ............ H04R 1/021 381/306 |
| 9,247,333 B2 | 1/2016 | Akino | |

(Continued)

FOREIGN PATENT DOCUMENTS

| | | |
|---|---|---|
| EP | 2343872 A1 | 7/2011 |
| WO | 2005088944 A1 | 9/2005 |
| WO | 2016191256 A1 | 12/2016 |

OTHER PUBLICATIONS

International Search Report and Written Opinion for International Application PCT/US2018/013016, dated Apr. 10, 2018, 16 pages.

*Primary Examiner* — Mohammad Islam
(74) *Attorney, Agent, or Firm* — Brake Hughes Bellermann LLP

(57) ABSTRACT

A computing device may include a multi-functional port in a base housing of the device. The multi-functional port may include an audio input device that can receive and process external audio input signals through an opening in the base housing. The multi-functional port may include a light source that can output light through the opening in the base housing. The multi-functional port may include a microphone boot. The microphone boot may guide external audio input signals into to the audio input device for processing. The microphone boot may also guide light, emitted by the light source, out of the base housing.

25 Claims, 11 Drawing Sheets

(56) References Cited

U.S. PATENT DOCUMENTS

| | | | |
|---|---|---|---|
| 2005/0021890 A1* | 1/2005 | Baker | H04L 69/18 710/62 |
| 2006/0037084 A1* | 2/2006 | Brown | G06F 21/85 726/28 |
| 2010/0284525 A1* | 11/2010 | Sander | H04R 1/1091 379/93.06 |
| 2011/0170728 A1* | 7/2011 | Chen | H04R 1/021 381/365 |
| 2012/0201048 A1 | 8/2012 | Prais | |
| 2014/0344495 A1* | 11/2014 | Zeung | G06F 1/1632 710/303 |
| 2016/0328343 A1* | 11/2016 | Foster | G06F 13/36 |

\* cited by examiner

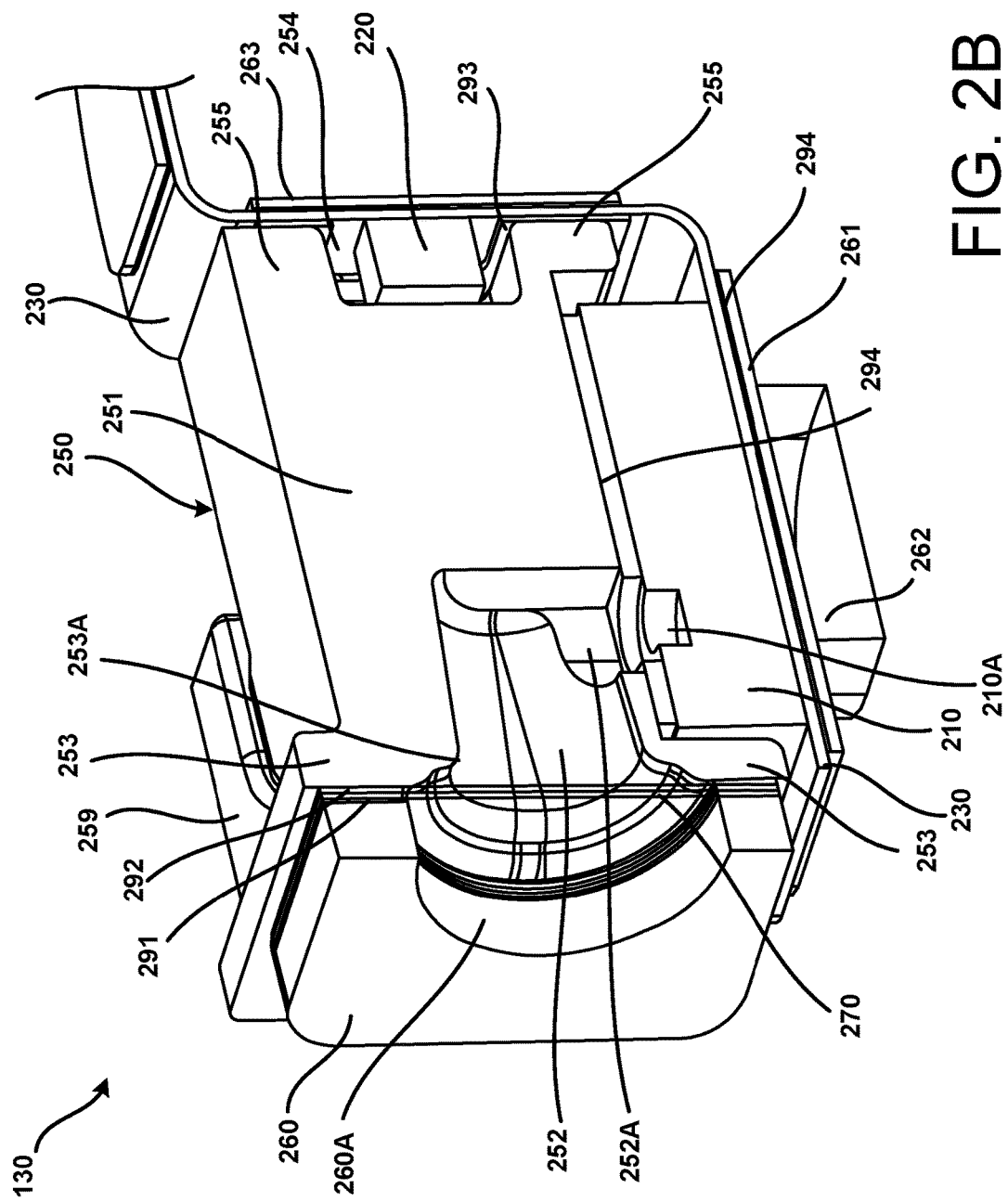

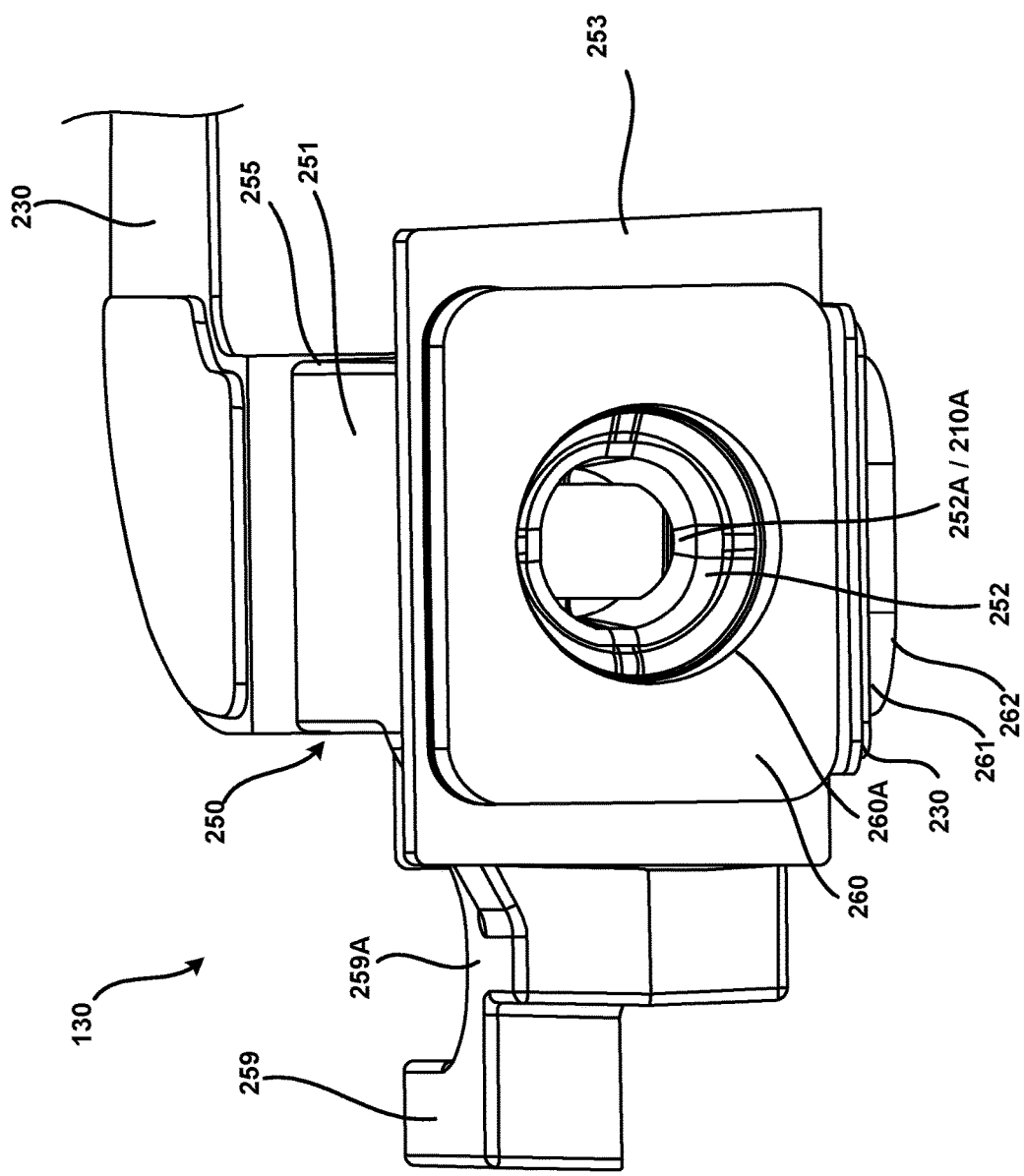

COMBINED MICROPHONE AND LIGHTING DEVICE AND COMPUTING DEVICE HAVING SAME

FIELD

This relates, generally, to multi-function ports in computing devices.

BACKGROUND

Computing devices may include, for example, laptop computers, convertible computers, tablet computers, mobile phones with smartphone capabilities, and other such devices. These types of computing devices may include various types of user interfaces providing for input and output of information, various types of external interface ports, audio input and audio output components, and other such features. Expansion in the field of computing devices drives a need for reduction in the size of components, and more efficient placement of components.

SUMMARY

In one aspect, a combination port for a computing device may include a microphone boot; a microphone coupled to a printed circuit board (PCB); a light source coupled to the PCB; a first cavity defined in a first end portion of the microphone boot, the first cavity defining a first opening at the first end portion of the microphone boot, and a second opening in a wall of the first cavity, the first opening being in fluid communication with the second opening, and the microphone being coupled to a side portion of the microphone boot such that a microphone port of the microphone is aligned with the second opening in the wall of the first cavity; and a second cavity defined in a second end portion of the microphone boot, the light source being disposed in the second cavity.

In another aspect, a multi-functional port for a computing device may include a microphone boot. The microphone boot may include a body portion; a first cavity at a first end portion of the body portion, the first cavity being defined by a closed proximal end, an open distal end, and a tapered wall extending between the closed proximal end and the open distal end; a second cavity at a second end portion of the body portion; a first flange extending outward from the open distal end of the first cavity; a second flange surrounding an open end of the second cavity; and an attachment bracket extending outward from a side portion of the body portion. The multi-functional port may also include a microphone attached to a bottom portion of the microphone boot; and a light source installed in the second cavity.

The details of one or more implementations are set forth in the accompanying drawings and the description below. Other features will be apparent from the description and drawings, and from the claims.

BRIEF DESCRIPTION OF THE DRAWINGS

FIGS. 2A-2B are partial cross sectional views taken along line A-A of FIG. 1A.

FIG. 3A is a front view.

DETAILED DESCRIPTION

Expansion in the capabilities of computing devices, together with a move towards thinner computing devices, drives a need for reduction in the size of components, and more efficient placement of components in computing devices. Installation of multiple components in a shared space, or a shared port, may allow for more efficient use of component installation space in a computing device. In a computing device including a multi-function port, in accordance with implementations described herein, a combination port may accommodate a light source and an audio input device in a single installation port. The combination port may include a microphone boot that directs audio (e.g., sound, soundwaves) input into the port, and to a microphone for processing. The microphone boot may also function as a light guide that guides light emitted by the light source out of the port. A shape, a size, a material and a construction of the microphone boot may facilitate this multiple functionality in a relatively compact space in the computing device, without impacting acoustic quality and/or light output quality.

Figure 1A:
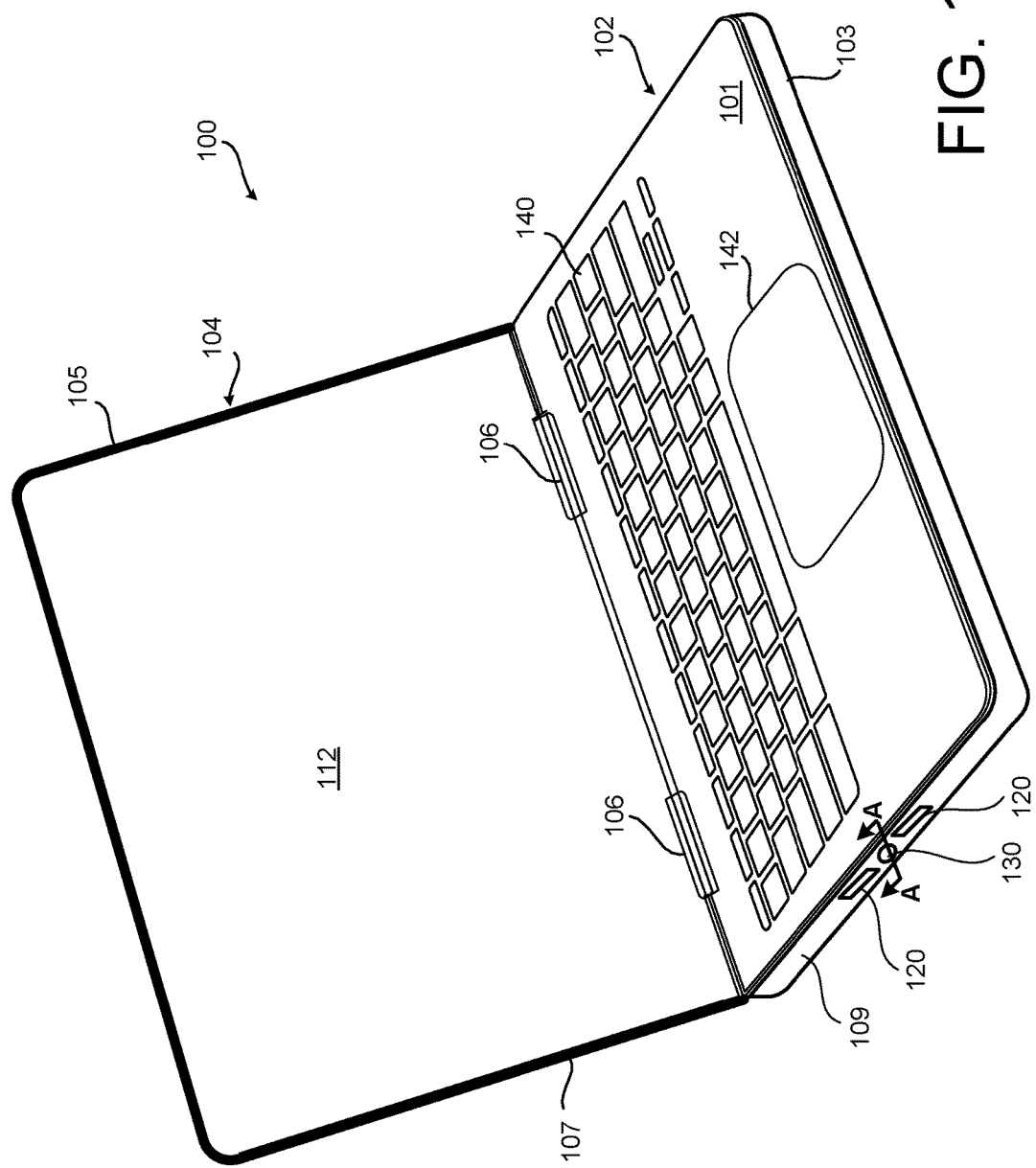
FIGS. 1A-1D illustrate an example computing device, in accordance with implementations described herein.
Figure 1B:
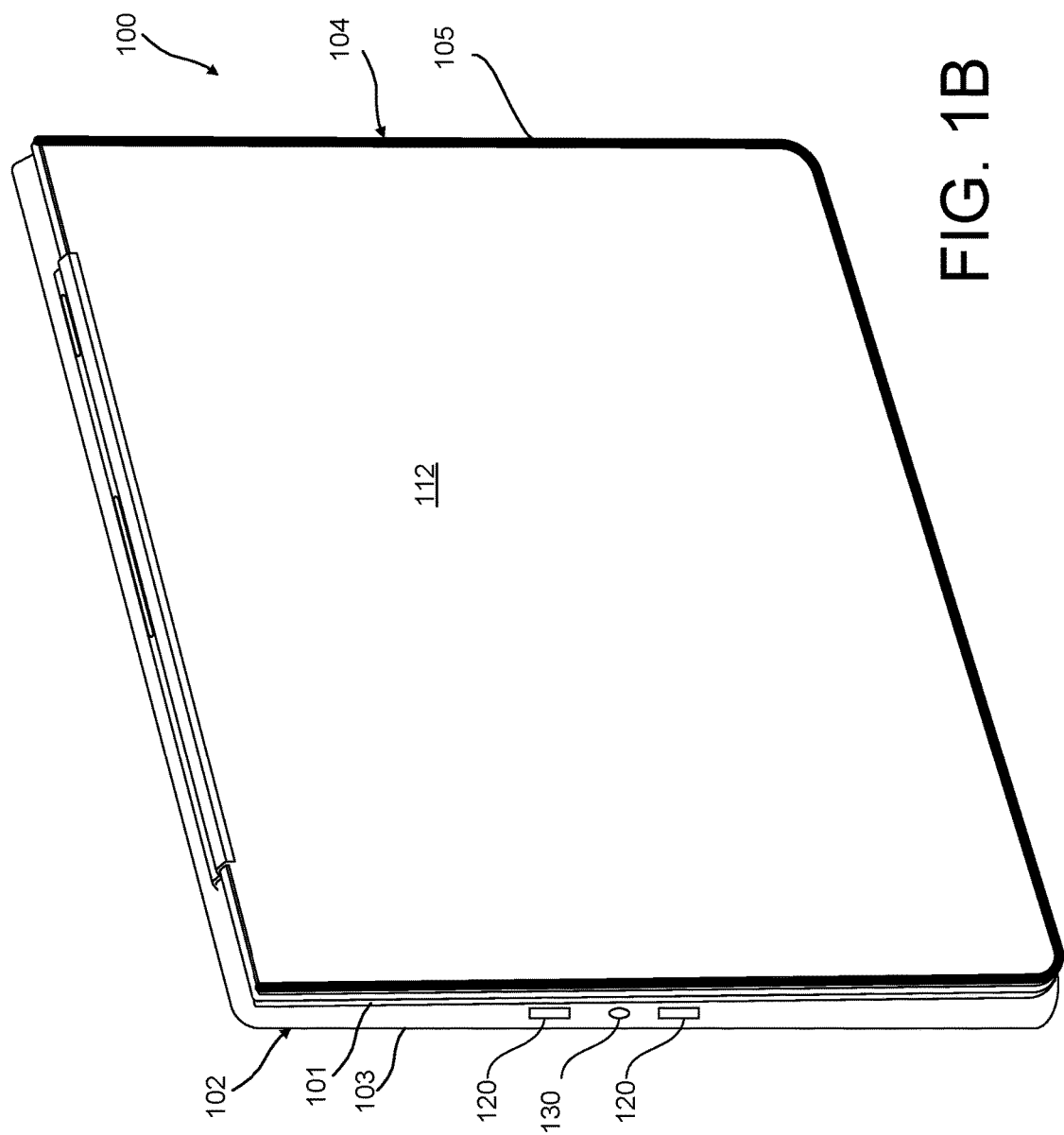
Figure 1C:
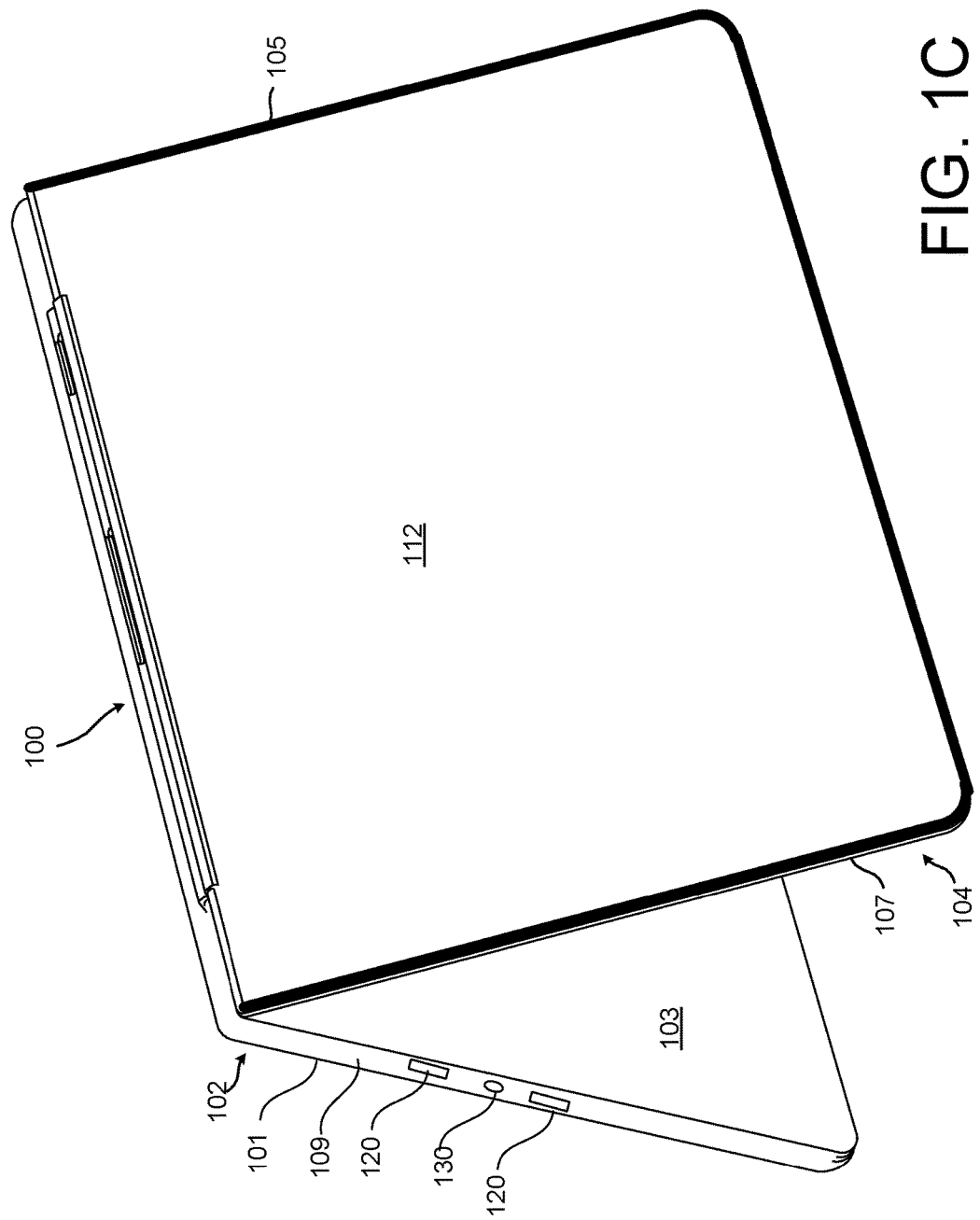
Figure 1D:
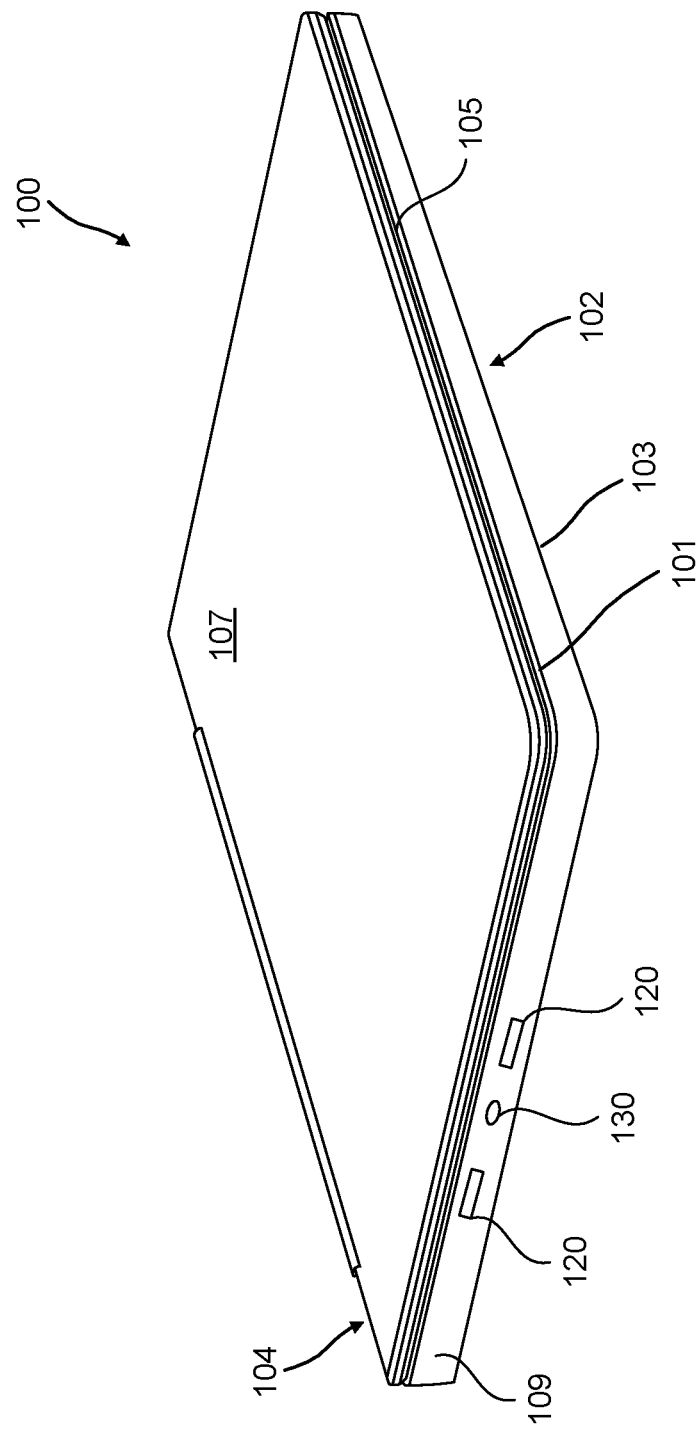

FIGS. 1A-1D illustrate an example portable computing device 100, in accordance with one example implementation. The example implementation shown in FIGS. 1A-1D illustrates a hybrid computing device 100. In some implementations, the example hybrid computing device 100 may operate in a laptop mode, or notebook computer mode, as shown in FIG. 1A. In some implementations, the example hybrid computing device 100 may operate in a tablet mode, as shown in FIG. 1B. In some implementations, the example hybrid computing device 100 may operate in an easel mode, as shown in FIG. 1C. FIG. 1D illustrates the computing device 100 in a closed position. The example computing device 100 shown in FIGS. 1A-1D is just one example of a computing device, and the principles to be described herein may be applied to various other types of computing devices, including, for example, a handheld computing device such as a smartphone, a tablet computing device, a desktop computing device, and other such devices.

The example computing device 100 may include a base housing 102 coupled to a display housing 104 by, for example, a coupling mechanism such as a hinge assembly 106. The base housing 102 may include a lower surface 103 and an upper surface 101 that is opposite and generally parallel to the lower surface 103. Input devices, including, for example, a keyboard 140, a trackpad 142 and other such input devices may be provided on the upper surface 101 of the base housing 102. The base housing 102 may house various components of the computing device 100, such as, for example, a main logic board (MLB), central processing unit (CPU), a memory, a battery, input sensors, graphics cards, cooling mechanisms, structures supporting various external connections, and the like. The display housing 104 may include an outer surface 107 and a bezel surface 105, with a display 112 received in the display housing 104 and exposed for viewing by the user through an opening in the display housing 104 at the bezel surface 105.

One or more interface ports 120 may be included in the base housing 102, for example, on a lateral side of the base housing 102, as shown in FIGS. 1A-1D. In some implementations, the interface port(s) 120 may provide for connection with an external device. In some implementations, a connection made through the interface port(s) 120 may provide for exchange of data with an external device. In some implementations, a connection made through the interface port(s) may provide for the exchange of power to, for example, charge the computing device 100 from an external power source, and/or to charge an external device from power stored in a power storage device of the computing device 100. In some implementations, a connection made through the interface port(s) may provide for both the exchange of data and the exchange of power. In some implementations, a combination port 130 may be included in the base housing 102. The combination port 130 may provide multiple functionality in a single port. This may allow for a more compact design, and help to reduce an overall thickness and/or an overall size of the computing device 100. In the example shown in FIGS. 1A-1D, a single combination port 130 is included in the lateral side 109 of the base housing 102, between two interface ports 120, for purposes of discussion and illustration. In some implementations, the computing device 100 may include multiple combination ports 130. In some implementations, the combination port(s) 130 may be positioned at other locations on the computing device 100.

Figure 2A:
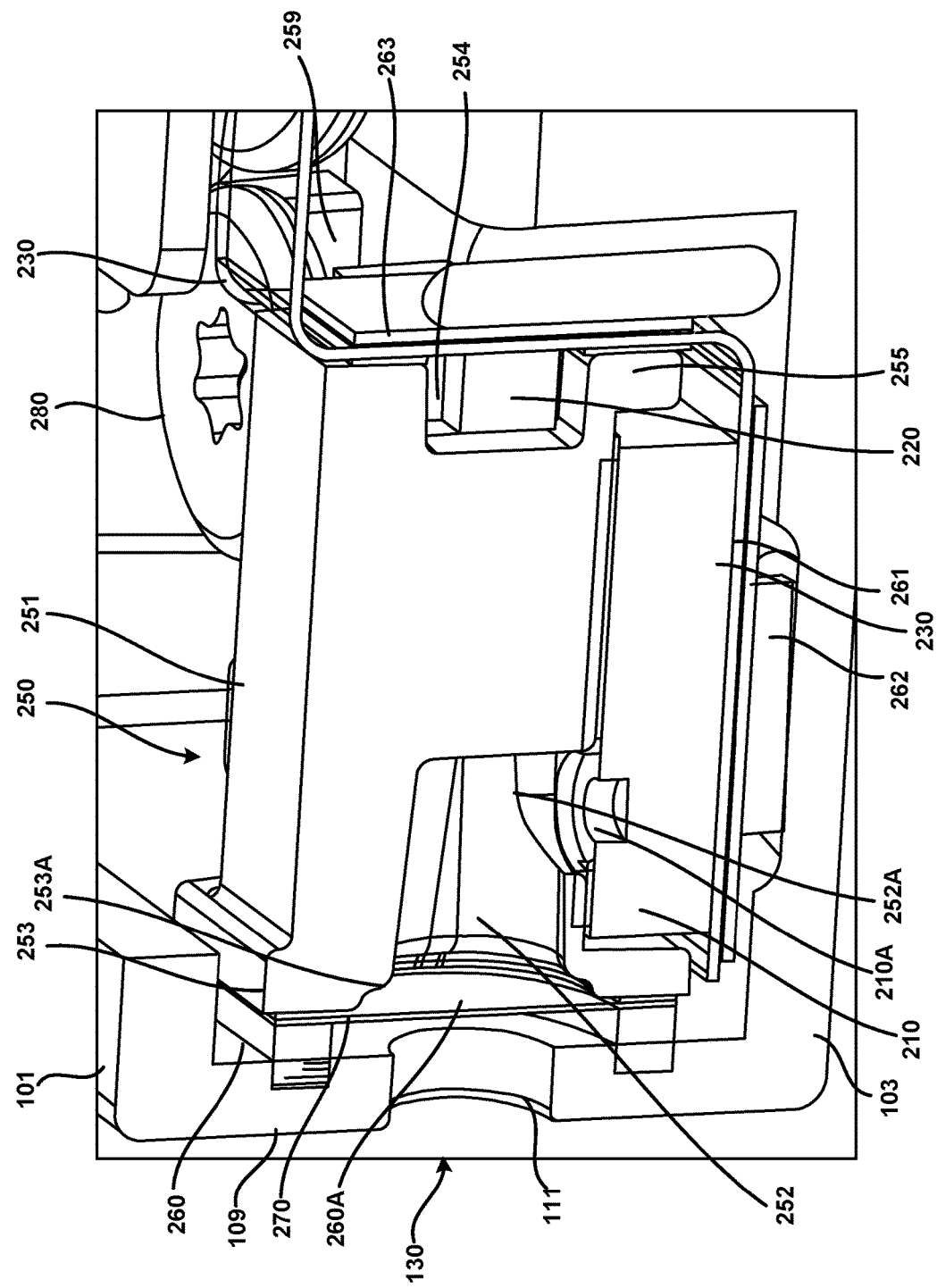

FIG. 2A is a partial cross sectional view, taken along line A-A of FIG. 1A, illustrating components of the combination port 130, in accordance with implementations described herein. FIG. 2B is a perspective, cross sectional view of the combination port 130 shown in FIG. 2A, with the base housing 102 not shown or removed. In this example, the combination port 130 is a combination microphone and light port, accommodating both a microphone 210 and a light source 220. The microphone 210 and the light source 220 may be mounted on a flexible printed circuit board (FPCB) 230. In this example arrangement, the microphone 210 may capture audio signals to be processed by the computing device 100, through an opening 111 in the lateral side 109 of, for example, the base housing 102. The light source 220 may output a status indicator, in the form of light illuminated outside the base housing 102 through the opening 111 in the lateral side 109 of the base housing 102. In some implementations, the status indicator generated by the light source 220 may provide an indication of progress of a charging operation of the computing device 100, and/or a battery power level remaining in the computing device 100. In some implementations, the status indicator generated by the light source 220 may indicate whether or not the computing device 100 is receiving power. In some implementations, the status indicator generated by the light source 220 may confirm that an external device has established a connection with the computing device 100 via, for example, one of the interface ports 120.

A microphone boot 250 may be positioned between the microphone 210, the light source 220 and the opening 111 in the lateral side 109 of the base housing 102 (not shown in FIG. 2A or 2B), as shown in FIGS. 2A and 2B. In some implementations, a body portion 251 of the microphone boot 250 may be positioned on the microphone 210, between the light source 220 and the opening 111. A first plate 261 may provide structural support for the microphone 210 mounted on a corresponding portion of the flexible PCB 230. In some implementations, the first plate 261 may include some level of flexibility, coupled with adequate stiffness, to prevent damage to solder joints at the microphone 210. A second plate 263 may provide structural support for the light source 220 mounted on a corresponding portion of the flexible PCB 230. In some implementations, the second plate 263 may include some level of flexibility, coupled with adequate stiffness, to prevent damage to light source connection points.

Prevention of leakage between the combination port 130 and the housing 102 (of light transmission from the light source 220 through the first cavity 252 and out through the opening, and of sound through the opening 111 and the first cavity 252 and into the microphone 210) may provide for efficient and effective sound and light transmission, Seals at a first area, between the lateral side 109 of the housing 102 and the microphone boot 250, and at a second area between the microphone 210 and the microphone boot 250, may seal the leakage paths which may affect sound and light transmission. A front flange 253 may be formed at a front end portion of the body portion 251, and a rear flange 255 may be formed at a rear end portion of the body portion 251. A first seal 260 may be positioned between the lateral side 109 of the base housing 102 and the microphone boot 250. The first seal 260 may form a direct seal between the microphone boot 250 and the housing 102. The first seal 260 may include an opening 260A that surrounds the opening 111 in the lateral side 109 of the housing 102. In some implementations, the first seal 260 may be made of a deformable, or compressible, material that can provide an acoustic seal, and provide for sound isolation. For example, in some implementations, the first seal 260 may be made of a foam material, such as, for example, a closed cell silicone material. The first seal 260 may isolate the components of the combination port 130, and in particular, the microphone 210, from other sources of noise installed in the base housing 102. For example, the first seal 260 may isolate the microphone 210 from noise generated by the operation of components such as speakers, cooling fans, and other such components installed in the housing 102.

In some implementations, the first seal 260 reduce or substantially eliminate echo effects due to multiple acoustic paths to the microphone 210. Noise generated by other components installed in the housing 102 (not shown in FIG. 2A or 2B), and/or generated by other sources not intended for processing by the microphone 210, may interfere with the audio signals, external to the housing 102, that are to be captured and processed by the microphone 210.

A second seal 262 may be positioned between the first panel 261 and the lower surface 103 of the base housing 102 (not shown in FIG. 2A or 2B). An adhesive layer 294, for example, a pressure sensitive adhesive layer, may be positioned between the microphone 210 and the microphone boot 250. The adhesive layer 294 may prevent leakage between the microphone 210 and the microphone boot 250, particularly in the area of the opening 252A in the cavity 252 and the microphone port 210A. The second seal 262 may not necessarily form a direct seal between the microphone 210 and the microphone boot 250. Rather, the second seal 262 may be made of deformable, or compressible, material that may be compressed during assembly, forcing pressure upward and applying pressure to the adhesive layer 294 to secure the seal between the microphone 210 and the microphone boot 250. The second seal 262 may also provide an acoustic seal, and provide for sound isolation. For example, in some implementations, the second seal 262 may be made of a foam material, such as, for example, a closed cell silicone material. In some implementations, the second seal 262 may help to properly position the microphone 210, ensuring that the microphone 210 remains securely positioned against the microphone boot 250, and that the microphone boot 250 and the light source 220 remain properly positioned relative to the opening 111. In some implementations, the second seal 262 may provide dampening support to the microphone 210, the microphone boot 250 and the light source 220.

A first opening 253A defined by the inner periphery of the front flange 253 may lead into a first cavity 252 formed in a first end portion of the body portion 251 of the microphone boot 250. The first cavity 252 may guide external audio input from the opening 111 in the base housing 102 toward the microphone 210 for processing. The rear flange 255 may extend around the periphery of a second cavity 254 formed in a second end portion of the body portion 251 of the microphone boot 250. The second cavity 254 may partially define a chamber enclosing the light source 220. In some implementations, the body portion 251 of the microphone boot 250 may serve as a light guide that guides light, generated by the light source 210, into the first cavity 252. The first cavity 252 may then guide light from the body portion 251 out through the opening 111 in the base housing 102.

In general, for a light source having a given output level, a material for the microphone boot 250, and in particular, a level of transparency, or translucency, or transmissivity of the material, may be selected based on a number of different factors and/or combinations of factors. Such factors may include, for example, a distance from the light source 220 to the opening 111, a length of the portion of the microphone boot 250 serving as the light guide, the desired level of mixing of light emitted by the light source 220, and/or the desired light output level external to the computing device 100. For example, in general, a longer microphone boot 250 will provide more space, or distance, over which light emitted by the light source 220 may mix. In such an exemplary longer microphone boot 250, a material having a lower level of transparency (or a higher level of opacity) may be used to yield a desired light output level.

In some implementations, the microphone boot 250 may be made of a plastic material. In some implementations, the microphone boot 250 may be made of a molded plastic material. Properties of the molded plastic material may include liquid plastic flow properties that allow relatively thin portions of the microphone boot 250 to be molded, and yet to maintain a balance between necessary strength and/or stiffness with ductility when hardened, particularly in the relatively thin portions of the microphone boot 250. For example, some portions of the microphone boot 250 may have a thickness of less than 0.10 mm, or as small as 0.10 mm (e.g., 0.17 mm, 0.15 mm, 0.12 mm, 0.10 mm). In some implementations, the thinnest portion may be, for example, 0.20 mm. These types of material properties may also provide for accurately molding various complex geometries of the microphone boot 250.

A transparency, or translucency, or transmissivity, of the plastic material may be such that the microphone boot 250, and in particular, the body portion 251 of the microphone boot 250, may serve as a light guide. For example, the light source 220 may be a light emitting diode (LED) selectively emitting red and/or blue and/or green light and/or combinations thereof. In this arrangement, the body portion 251 of the microphone boot 250, serving as a light guide, may provide for the mixing of light generated by the light source 220. In this arrangement, the body portion 251 of the microphone boot 250, serving as a light guide, may provide for uniformity of the light generated by the light source 220 and output through the opening 111, external to the computing device 100.

In some implementations, an inner peripheral surface (e.g., sidewall) of the first cavity 252 formed in the body portion 251 of the microphone boot 250 may be relatively transparent (i.e., have the transparency qualities associated with the material of the microphone boot 250). In some implementations, an inner peripheral surface of the second cavity 254 formed in the body portion 251 of the microphone boot 250 may be relatively transparent (i.e., have the transparency qualities associated with the material of the microphone boot 250). In some implementations, outer surfaces of the microphone boot 250, such as, for example, outer surfaces of the body portion 251 and/or the front flange 253 and/or the rear flange 255, may be coated, or treated, for example, painted, with a substantially opaque material. This may allow light emitted by the light source 220 to be more effectively guided through the body portion 251, the first cavity 252 and out through the opening 111. This may help to increase (e.g., maximize) the output of light through the opening 111 in the base housing 102 (not shown in FIG. 2A or 2B), and may help to decrease (e.g., minimize) loss of light through the outer surfaces of the body portion 251 and/or the front flange 253 and/or the rear flange 255 of the microphone boot 250.

In some implementations, the first cavity 252 may have a curved, or substantially round, cross section. In some implementations, the peripheral surface of the first cavity 252 may be tapered. For example, a proximal end of the first cavity 252 may be more narrow than a distal end of the first cavity 252, adjacent to the opening 253A. In the example shown in FIGS. 2A-2B, in which the cross section of the first cavity 252 is substantially round, or circular, the diameter of the first cavity 252 the proximal end may be less than the diameter of the first cavity 252 at the distal end, adjacent to the opening 253A.

In some implementations, the tapered, substantially smooth, continuous geometry described above may define a light output path that is uninterrupted by edges, corners, or other changes in geometry which may disrupt the output of light through the opening 111, and/or which may affect uniformity of light output through the opening 111. In some implementations, the geometry of the first cavity 252 may be substantially symmetrical. This may allow light emitted by the light source 220 and output through the opening 111 in the base housing 102 to appear substantially the same, externally, at different viewing angles. That is, the taper, or contour of the first cavity 252 may provide an angle of refraction such that light generated by the light source is guided out through the opening 111 and toward the user.

In some implementations, the tapered, substantially smooth, continuous geometry described above may define an audio path that guides external audio inputs, for example from the opening 111 into a port 210A of the microphone 210 through, for example, a corresponding audio opening 252A in the first cavity 252. In some implementations, the port 210A of the microphone and the audio opening 252A in the first cavity 252 may be concentrically arranged, to effectively guide audio inputs into the microphone 210. In some implementations, a thickness of the microphone boot 250 at the audio opening 252A may be arranged so that little to no portion of the microphone 210 is visible through the opening 111, and so that the microphone 210 does not interfere with the passage of light through the first cavity 252. In some implementations, the thickness of the microphone boot 250 at the audio opening 252A, and a corresponding distance from the entry into the audio opening 252A to the microphone port 210A, may be set taking into consideration an effect on frequency response and performance of the microphone 210, versus an effect on the output of light. That is, in some instances, components of the microphone 210, and in particular, the diaphragm of the microphone 210, may be sensitive to light, the light potentially producing noise and distortion it audio signals to be processed by the microphone 210. The recessed position of the microphone port 210A, through the audio opening 252 of the first cavity 252, may isolate the transmission of light through the microphone boot 250 from the processing of audio signals by the microphone 210, thus reducing or substantially eliminating any adverse effects of the light transmission on the processing of audio signals.

In some implementations, an acoustic mesh panel 270 may be positioned between the front flange 253 of the microphone boot 250 and the first seal 260. The acoustic mesh panel 270 may extend across the opening 260A in the first seal 260, and across the opening 253A in the microphone boot 250 defined by an inner periphery of the first flange 253. The acoustic mesh panel 270 may dampen a frequency response due to the distance between the opening 111 through which an audio input is introduced and the microphone port 210A. In some implementations, the acoustic mesh panel 270 may somewhat equalize or equalize higher frequency and lower frequency inputs, as well as provide protection to the microphone 210. The acoustic mesh panel 270 may also further diffuse light output through the opening 111, providing for additional uniformity in the light output from the base housing 102.

Figure 3B:
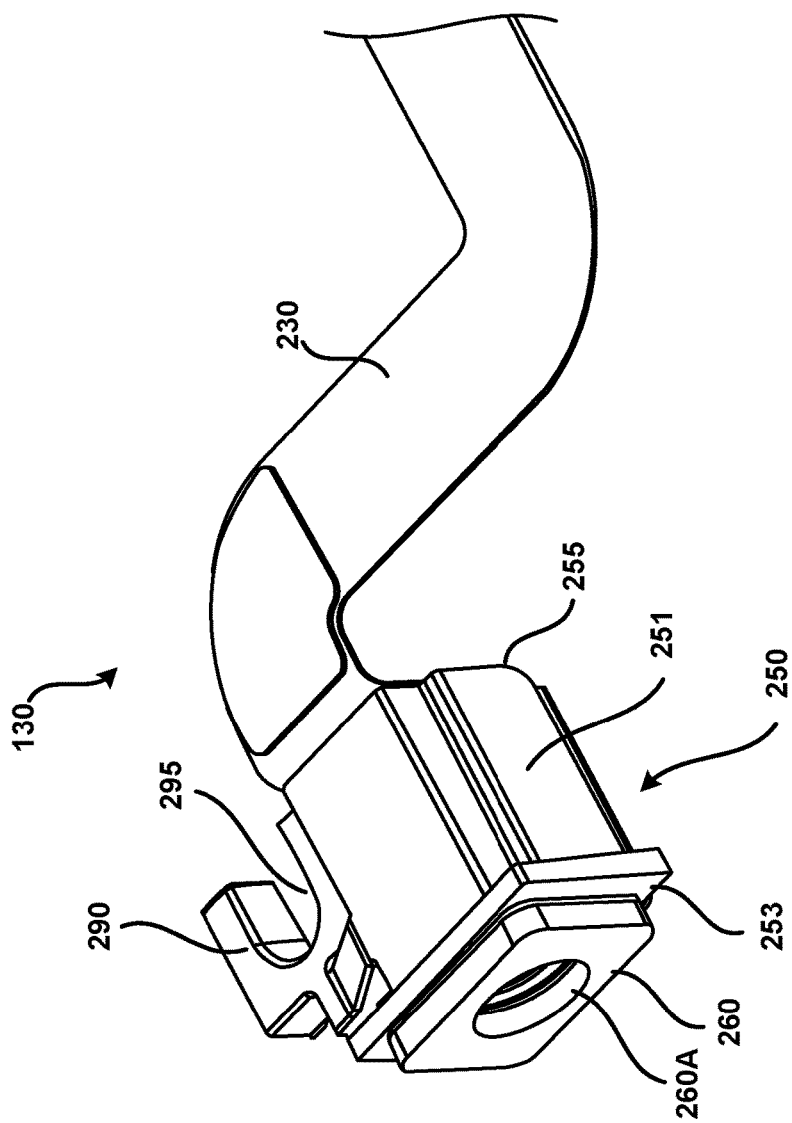
FIG. 3B is a perspective view.
Figure 3C:
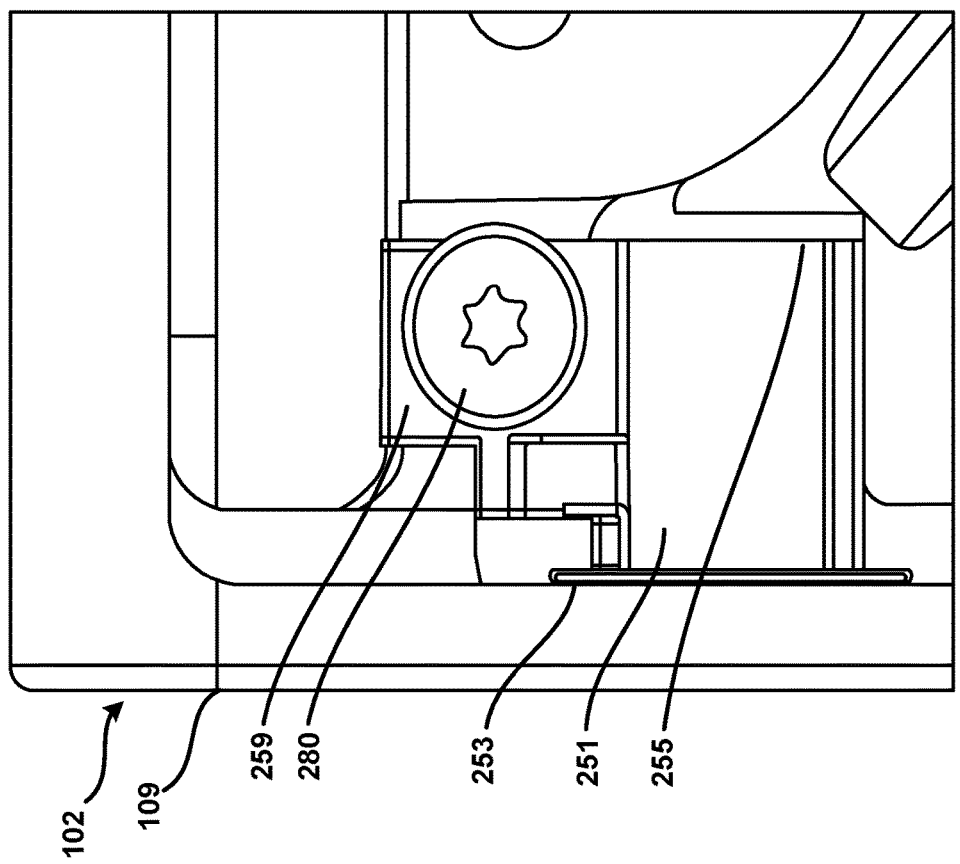
FIG. 3C is a top view, of a combination port of a computing device, in accordance with implementations described herein.

FIG. 3A is a front view of the combination port 130, and FIG. 3B is a perspective view of the combination port 130, in which an attachment bracket 259 of the microphone boot 250 is visible. FIG. 3C is a partial top view of a portion the base housing 102 of the example computing device 100, with the upper surface 101 of the base housing 102 not shown or removed, to illustrate the installation of the combination port 130 in the base housing 102.

As shown in FIGS. 3A-3C, the attachment bracket 259 may extend outward from the body portion 251 of the microphone boot 250. The attachment bracket 259 may include a coupling portion 259A. A fastener 280, such as, for example, a threaded fastener 280, may extend through the coupling portion 259A of the attachment bracket 259 and into the bottom surface 103 of the base housing 102 to couple the microphone boot 250 to the base housing 102. In some implementations, the combination port 130 may be secured in the base housing 102 by a single attachment point at the fastener 280 and attachment bracket 259, together with various other adhesive layers. In some implementations, the fastener 280 and the attachment bracket 259 may secure the combination port 130 in the base housing 102 (not shown in FIGS. 3A-3C) in a first direction, for example, a vertical direction. In some implementations, the various adhesive layers may secure the combination port 130 in the base housing 102 in a second direction, for example, in a lateral, or transverse, or horizontal direction.

For example, as shown in FIG. 2B, a first adhesive layer 291 may be applied between the first seal 260 and the acoustic mesh 270. A second adhesive layer 292 may be applied between the acoustic mesh and the front flange 253 of the microphone boot 253. The increased, outwardly extending surface area of the front flange 253 may provide additional adhesion surface area, thus improving adhesion between the front portion of the microphone boot 250 and the lateral side 109 of the base housing 102. A third adhesive layer 293 may be applied between the rear flange 255 and the flexible PCB 230. In some implementations, the third adhesive layer 293 may surround the light source 220 mounted on the flexible PCB 230. The increased surface area of the rear flange 255 may provide additional adhesion surface area, thus improving adhesion between the rear portion of the microphone boot 250 and the flexible PCB 230. A fourth adhesive layer 294 may be applied to the plate 261, to secure and seal the microphone 210 mounted on the flexible PCB 230. In some implementations, some, or all, of the adhesive layers may be pressure sensitive adhesive layers.

Figure 4:
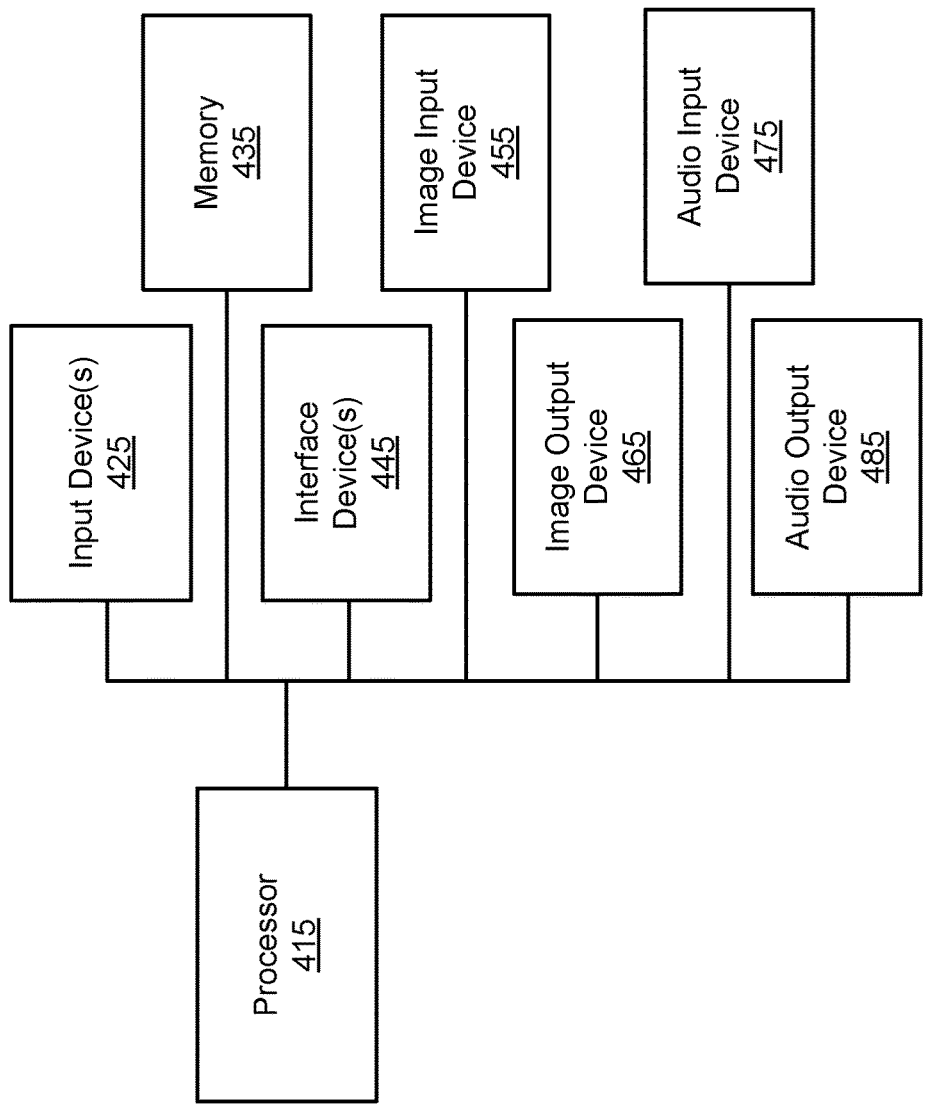
FIG. 4 is a block diagram of an example computing device, in accordance with implementations described herein.

FIG. 4 is a block diagram of a computing device 400, such as the example computing device 100 shown in FIGS. 1A-1D, or other computing devices as noted above. The example computing device 400 may include a processor 215. One or more input device(s) 425, such as, for example, a keyboard, a trackpad, a touchscreen and the like, may receive external input to be processed by the processor 415. One or more interface device(s) 445 may provide for communication with one or more external devices and/or may provide for an exchange of power with an external device. The computing device 400 may include an image input device 455 such as, for example, a camera, and an image output device 465 such as, for example, a display. The computing device may include an audio input device 475 such as, for example, a microphone, and an audio output device 485 such as, for example, a speaker. The example computing device 400 may include a memory 435. The computing device 400 may include more, or fewer components, and the block diagram shown in FIG. 4 illustrates just some components of the example computing device 400.

Figure 5:
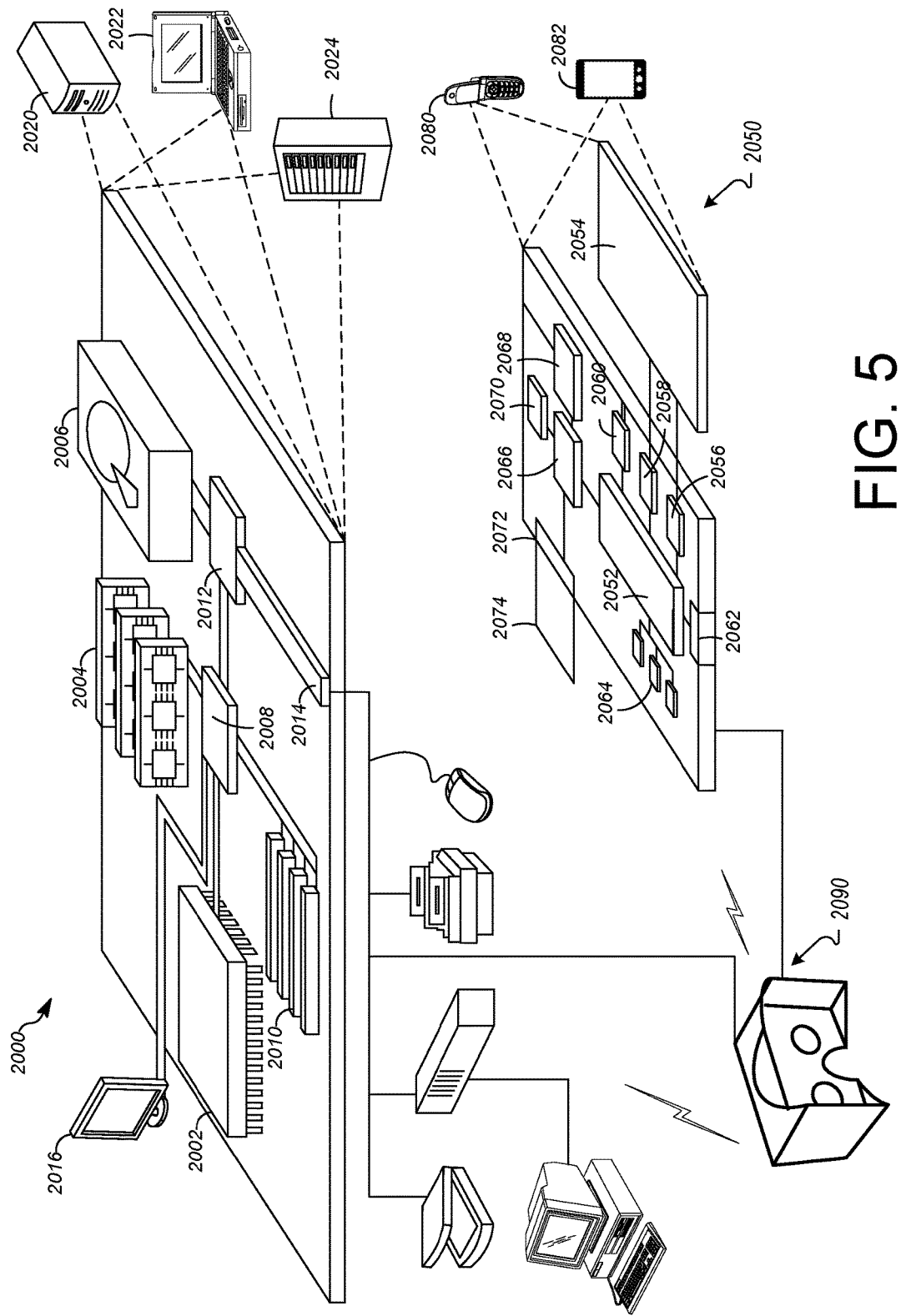
FIG. 5 illustrates example computing device(s) and mobile computing device(s) that can be used to implement the techniques described herein.

FIG. 5 shows an example of a computer device 2000 and a mobile computer device 2050, which may be used with the techniques described here. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provided as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset/HMD device 2090). For example, one or more sensors included on a computing device 2050 or other computing device depicted in FIG. 5, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control virtual objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR environment on the computing device 2050 or on the VR headset 2090.

In some implementations, a computing device 2050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers and devices, including, but not limited to laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A combination port for a computing device, the combination port including:
   a microphone boot;
   a microphone coupled to a printed circuit board (PCB);
   a light source coupled to the PCB;
   a first cavity defined in a first end portion of the microphone boot, the first cavity defining a first opening at the first end portion of the microphone boot, and a second opening in a wall of the first cavity, the first opening being in fluid communication with the second opening, and the microphone being coupled to a side portion of the microphone boot such that a microphone port of the microphone is aligned with the second opening in the wall of the first cavity;
   a second cavity defined in a second end portion of the microphone boot, the light source being disposed in the second cavity; and
   a body portion of the microphone boot positioned between the first cavity and the second cavity,
   wherein the first end portion of the microphone boot is configured to be positioned adjacent to an opening in a housing of a computing device, with the first opening aligned with the opening in the housing.

2. The device of claim 1, wherein the opening in the housing of the computing device is an input/output opening.

3. The device of claim 1, wherein the microphone boot also includes:
   a first flange portion at the first end portion of the microphone boot, surrounding the first opening into the first cavity; and
   a second flange portion at the second end portion of the microphone boot, surrounding the second cavity.

4. The device of claim 3, further comprising:
   a first panel supporting the coupling of the microphone to the PCB;
   a second panel supporting the coupling of the light source to the PCB;
   a first compressible seal at an outer surface of the first end portion of the microphone boot, and configured to be positioned between the first flange and the input/output opening in the housing;
   a second compressible seal configured to be positioned between the first panel and the housing; and
   an adhesive layer between the microphone and the microphone boot.

5. The device of claim 4, wherein the first compressible seal includes an opening, configured to be positioned corresponding to the input/output opening in the housing, and configured to be positioned corresponding to the first opening into the first cavity.

6. The device of claim 4, further comprising an acoustic mesh panel positioned between the first compressible seal and the first flange of the microphone boot.

7. The device of claim 1, further comprising:
   an attachment bracket extending outward from a side portion of the body portion of the microphone boot; and
   a fastener extending through the attachment bracket, wherein the fastener is configured to extend into the housing to couple the combination port in the housing.

8. The device of claim 1, wherein the body portion of the microphone boot is configured to guide light, emitted by the light source installed in the second cavity, into the first cavity, and wherein the first cavity is configured to guide light out of the combination port through the first opening in the first cavity and out of the computing device through the input/output opening in the housing.

9. The device of claim 8, wherein the microphone boot is made of a translucent material having greater than 50% transmissivity.

10. The device of claim 1, wherein the first cavity is configured to receive external audio inputs through the input/output opening in the housing and the first opening of the first cavity, and to guide the received external audio inputs to the microphone through the second opening of the first cavity and the microphone port of the microphone.

11. The device of claim 1, wherein the first cavity includes:
a distal end at which the first opening is formed;
a closed proximal end; and
the wall defining a periphery of the first cavity, extending between the proximal end and the distal end.

12. The device of claim 11, wherein the first cavity has a substantially circular cross section.

13. The device of claim 12, wherein a cross sectional area of the first cavity at the proximal end of the first cavity is less than a cross sectional area of the first cavity at the distal end.

14. The device of claim 13, wherein the peripheral wall of the first cavity is tapered such that the first cavity becomes gradually wider from the proximal end to the distal end of the first cavity.

15. The device of claim 14, wherein the taper of the first cavity is substantially linear from the proximal end of the first cavity to the distal end of the first cavity.

16. A multi-functional port for a computing device, comprising:
a microphone boot, including:
a body portion;
a first cavity at a first end portion of the body portion, the first cavity being defined by a closed proximal end, an open distal end, and a peripheral wall extending between the closed proximal end and the open distal end, wherein the peripheral wall of the first cavity is tapered such that the first cavity becomes gradually wider from the proximal end to the distal end of the first cavity;
a second cavity at a second end portion of the body portion;
a first flange extending outward from the open distal end of the first cavity;
a second flange surrounding an open end of the second cavity; and
an attachment bracket extending outward from a side portion of the body portion;
a microphone attached to a bottom portion of the microphone boot; and
a light source installed in the second cavity.

17. The port of claim 16, wherein
the body portion of the microphone boot is configured to guide light, emitted by the light source installed in the second cavity, into the first cavity, and
wherein the first cavity is configured to guide light out of the multi-functional port through the open distal end of the first cavity.

18. The port of claim 16, wherein the first cavity is configured to receive external audio inputs through the open distal end of the first cavity, and to guide the received external audio inputs to the microphone through an opening in the peripheral wall of the first cavity, the opening in the peripheral wall of the first cavity being aligned with a microphone port of the microphone.

19. The port of claim 16, wherein the first cavity has a substantially circular cross section, and wherein a cross sectional area of the first cavity at the proximal end of the first cavity is less than a cross sectional area of the first cavity at the distal end.

20. The port of claim 16, wherein the peripheral wall of the first cavity is substantially linear.

21. A combination port for a computing device, the combination port including:
a microphone boot;
a microphone coupled to a printed circuit board (PCB);
a light source coupled to the PCB;
a first cavity defined in a first end portion of the microphone boot, the first cavity defining a first opening at the first end portion of the microphone boot, and a second opening in a wall of the first cavity, the first opening being in fluid communication with the second opening, and the microphone being coupled to a side portion of the microphone boot such that a microphone port of the microphone is aligned with the second opening in the wall of the first cavity, the first cavity including:
a distal end at which the first opening is formed;
a closed proximal end, and the wall defining a periphery of the first cavity, extending between the proximal end and the distal end; and
a second cavity defined in a second end portion of the microphone boot, the light source being disposed in the second cavity.

22. The device of claim 21, wherein the microphone boot also includes:
a first flange portion at the first end portion of the microphone boot, surrounding the first opening into the first cavity; and
a second flange portion at the second end portion of the microphone boot, surrounding the second cavity.

23. The device of claim 22, further comprising:
a first panel supporting the coupling of the microphone to the PCB;
a second panel supporting the coupling of the light source to the PCB;
a first compressible seal at an outer surface of the first end portion of the microphone boot, and configured to be positioned between the first flange and an input/output opening in a housing of a computing device;
a second compressible seal configured to be positioned between the first panel and the housing; and
an adhesive layer between the microphone and the microphone boot.

24. The device of claim 23, wherein the first compressible seal includes an opening, configured to be positioned corresponding to the input/output opening in the housing, and configured to be positioned corresponding to the first opening into the first cavity.

25. The device of claim 24, further comprising a body portion of the microphone boot positioned between the first cavity and the second cavity, wherein the body portion of the microphone boot is configured to guide light, emitted by the light source installed in the second cavity, into the first cavity, and
wherein the first cavity is configured to guide light out of the combination port through the first opening in the first cavity and out of the computing device through the input/output opening in the housing.

* * * * *